Sept. 18, 1956   W. H. PHELPS   2,763,492
REVERSIBLE HANDLE MOUNTING FOR A MOWER
Filed Dec. 12, 1952   2 Sheets-Sheet 1

INVENTOR.
William H. Phelps,
BY
Schroeder, Merriam,
Hofgren & Brady Attys.

Sept. 18, 1956  W. H. PHELPS  2,763,492
REVERSIBLE HANDLE MOUNTING FOR A MOWER
Filed Dec. 12, 1952  2 Sheets-Sheet 2
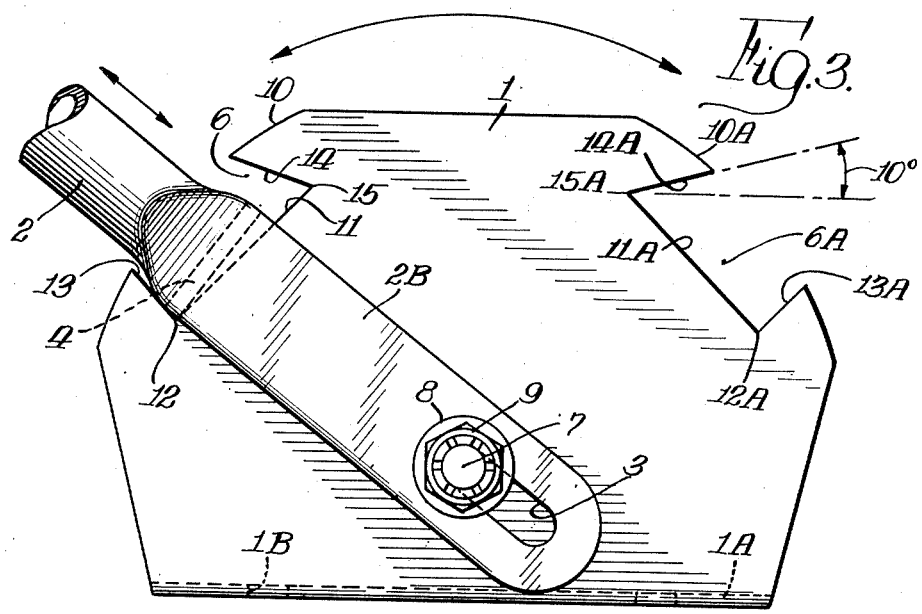
INVENTOR.
William H. Phelps,
BY
Schroeder, Merriam,
Hofgren & Brady Att'ys.

United States Patent Office 2,763,492
Patented Sept. 18, 1956

2,763,492
REVERSIBLE HANDLE MOUNTING FOR A MOWER

William H. Phelps, Ralston, Nebr.

Application December 12, 1952, Serial No. 325,606

4 Claims. (Cl. 280—47.36)

This invention relates to a reversible handle mounting for a mower or similar hand propelled or guided device having a four wheeled frame; and in particular it relates to a handle mounting which permits a handle for such a device to be swung through an arc of at least 90° so that the handle may be supported in an inclined position extending beyond either end of the device.

The invention is illustrated and described as applied to a mower, although it is obvious that it may be applied to any hand propelled or hand guided device having a four wheeled frame.

The principal object of the invention is to provide a simple and inexpensive assembly by means of which a mower handle for a platform type mower may extend toward either end of the mower.

A further object is to provide such an assembly in which the handle arms have lugs which engage notches in a mounting plate which have overhanging lips so that the handle may not be accidentally dislodged from the notches during use of the mower.

Yet another object is to provide such an assembly in which the margins of the notches which support the handle lugs intersect in a right angle and are at 45° to the vertical, and the relationship between the lugs and the handle arms is such that the arms are inclined at an angle substantially less than 45°. As a result, when the mower is pushed by means of the handle the horizontal component of the force exerted along the handle is greater than the vertical component.

It is often desirable to run a platform type mower in either direction, and in order to do this it is necessary to have a handle which may extend in either direction from the mower platform. Such an arrangement is particularly useful where a mower has a discharge channel through which grass clippings are discharged to one side of the mower. One of the principal advantages of the platform type mower is that the whirling horizontal blades usually strike each long grass clipping several times so as to chop it into relatively small pieces which may be left upon the lawn to form a mulch.

It is desirable to have the grass clippings cut into as short lengths as possible, and the cuttings are finer if they are all discharged into the uncut grass so that they may again be cut up by the cutter blades when the mower passes over the uncut area. In order that the mower may always discharge the clippings into the uncut grass it is necessary that the machine not be turned around at each end of a lawn; and in order to operate the machine without turning it around there must be a handle at each end so that the mower may merely be pushed back and forth in parallel paths. The device of this invention, therefore, is useful in permitting a single handle to be used to push a mower in either direction.

The invention is illustrated in a preferred embodiment in the accompanying drawings in which:

Fig. 3 is an enlarged side elevational view thereof; and

Fig. 4 is an end elevational view thereof.

Figure 1:
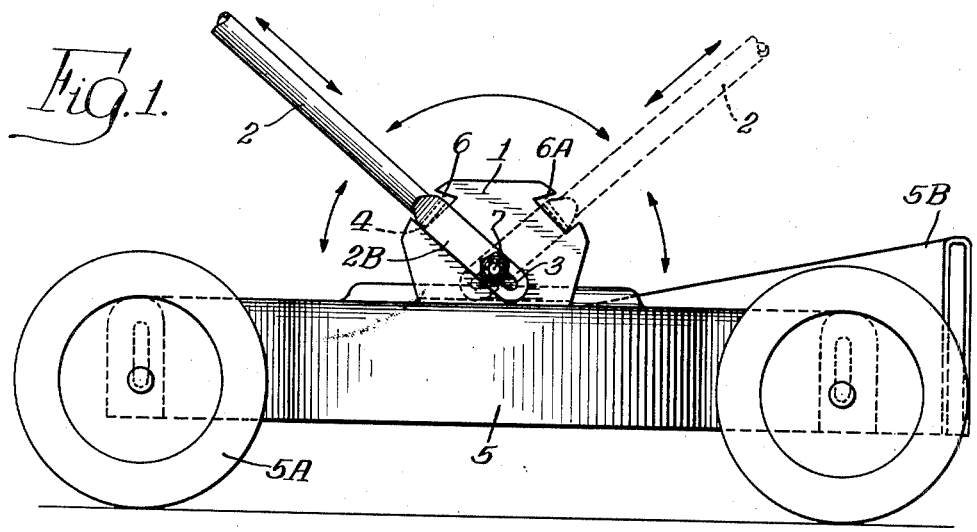
Fig. 1 is a fragmentary side elevational view of a mower equipped with the handle mounting of this invention, the handle arms being shown in full line in one position and in broken lines in its other position.

Referring to the drawings in greater detail, a mower is provided with a frame 5 having wheels 5A and a clippings discharge channel 5B through which clippings are thrown into the area alongside the mower. For clarity of illustration of the handle assembly the mower operating mechanism is not included in the drawings, as this may be any conventional electric or gasoline powered unit.

Figure 2:
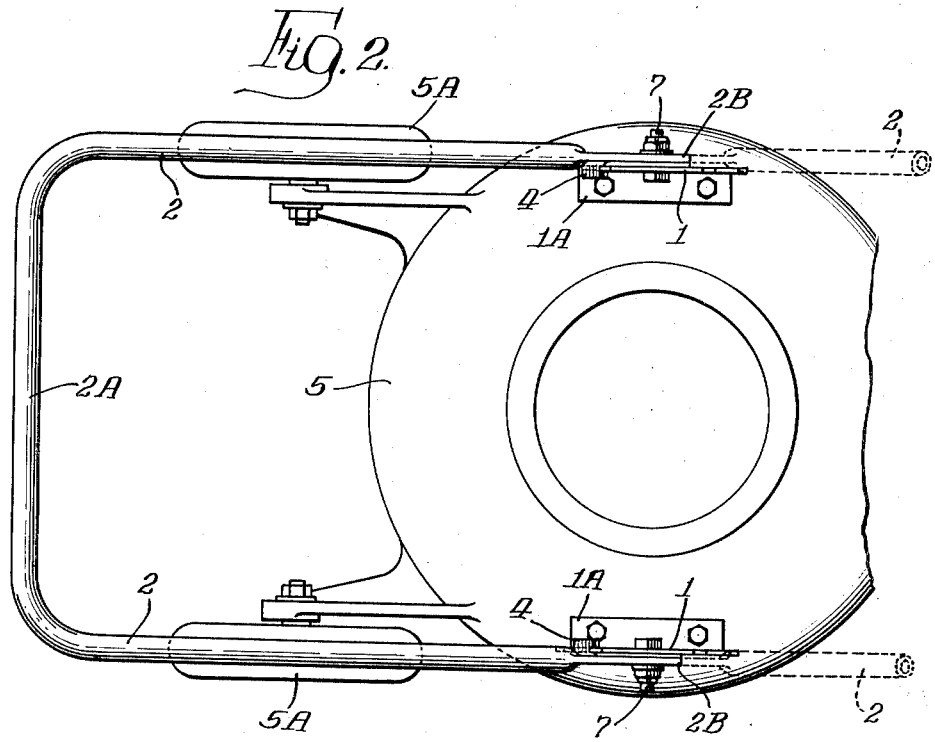
Fig. 2 is a fragmentary plan view of the mower with the handle in full lines in one position and shown fragmentarily in broken lines in its other position.

The reversible handle assembly includes a pair of mounting plates 1, and a pair of handle arms 2 which are connected by a cross bar 2A in the usual manner, as seen in Fig. 2. The mounting plates 1 are secured in parallel, longitudinally extending positions near the center portion of each side of the mower frame 5 by means of bottom flanges 1A which are provided with apertures 1B to receive bolts by which the plates are fastened to the frame.

The arms 2 of the handle have flattened portions 2B at their lower ends in which are longitudinal slots 3 by means of which the handles are pivotally and slidably mounted on bolts 7 which extend through holes in the plates 1 and through the slots 3 and are provided with washers 8 and self-locking nuts 9. The self-locking nuts 9 are drawn up tight enough to hold the handle arms 2 snugly on the bolts 7 but permit them to slide and pivot freely on said bolts.

Adjacent the top margin of the flattened portion 2B of each handle arm 2 is a transverse latch and thrust plate, or lug, 4 which may enter either of two notches 6 and 6A which are formed in the margin of each mounting plate 1.

As best seen in Fig. 3 the mounting plates have oppositely inclined marginal portions 10 and 10A in which the notches 6 and 6A are formed, each of said inclined portions being an arc of a circle with its center at the pivot formed by the bolt 7; and the bottoms of the notches lying on chords of said circle.

The notches 6 and 6A are identical, and thus only the notch 6 will be described in detail. The bottom margin 11 of the notch 6 is substantially wider than the latch plate 4 on the arm 2, and the lower corner 12 of the notch 6 forms a 90° angle between the lower margin 11 and a bottom side margin 13 of the notch, and the margins 11 and 13 of the notch are disposed at 45° to the vertical. The corner 12 is so positioned that the handle arm 2 is supported in an upwardly inclined position with respect to the pivot formed by the bolt 7. As indicated in Fig. 3 in connection with the notch 6A, the line of the top margin of each notch is only 10° above the horizontal, so that there is a substantial overhang provided by the margin 14 of the notch, and the opening of the notch is only slightly wider than the latch plate 4. Thus, the latch plate 4 may be disengaged from the notch 6 only by a longitudinal movement of the handle arm 2, as indicated by the straight arrow adjacent the handle arm.

In normal use of the mower, the pressure applied by the operator in pushing the mower can only press the latch plate 4 firmly against the bottom margin 11 of the notch 6, and even if some upward component is applied to the handle the latch plate 4 merely swings across the notch and is locked in the angle 15 at the intersection of the bottom margin 11 and the top margin 14 of the notch. In order to shift the handle from the full line position of Fig. 1 to the dotted line position of Fig. 1, it is necessary merely to pull straight back on the handle longitudinally of the arms 2 and swing the handle to the opposite end of the mower where the latch plate 4 may be engaged with the notch 6A by sliding the handle longitudinally down until the latch plate 4 contacts the bottom margin 11A of the notch 6A.

The foregoing detailed description is given for clearness of understanding only and no unnecessary limitations are to be understood therefrom, as some modifications will be obvious to those skilled in the art.

I claim:

1. A reversible handle mounting for a machine having a wheeled frame, comprising: a pair of parallel centrally disposed longitudinally extending plates on opposite sides of the frame, each plate having a horizontal base and a pair of upwardly open notches each of which has a substantially straight inclined lower side margin, said side margins of said pair of notches being inclined at equal angles to the base of the plate and in opposite directions; and a handle having arms which make swinging pin and slot connections with said plates below and midway between said notches at points above the bases of the plates so that the arms are swingable and longitudinally slidable, each of said arms having lug means to enter either of the notches on a plate so as to rest on the lower side margins of one or the other of said pair of notches to support the handle in an inclined position which forms a smaller angle to the base of the plate than the angle of said lower side margins of the notches.

2. A reversible handle mounting for a machine having a wheeled frame, comprising: a pair of parallel, centrally disposed longitudinally extending plates on opposite sides of the frame, each plate having a pair of upwardly open notches facing in opposite directions, each notch having a long, straight upwardly and inwardly inclined thrust-receiving bottom margin, an overhanging top margin, and a lower side margin which may support a handle lug; a handle having arms which make swinging pin and slot connections with said plates below and midway between said notches so that the arms are swingable and longitudinally slidable; and a wide, substantially flat bottomed thrust lug extending across each arm, each of said lugs being adapted to bear against the thrust receiving bottom margin of either of said notches and rest on the lower margin so as to support the handle in an inclined position, and being adapted upon upward swinging movement of the handle with the plate in the notch to thrust against the overhanging top margin.

3. A reversible handle mounting for a hand propelled rotary power mower having a wheeled frame, comprising: a pair of parallel, centrally disposed longitudinally extending plates on opposite sides of the frame, each plate having in its margin a pair of oppositely inclined open notches which have an inclined thrust bearing bottom surface, a lower supporting surface, and an upper surface which provides an overhanging lip; a handle having arms which make swinging pin and slot connections with said plates below and midway between the notches so that the arms are swingable and longitudinally slidable; and thrust lug means on said arms to enter either of the notches on a plate so as to rest on said lower supporting surface and thrust against said thrust bearing bottom surface when the mower is pushed by means of the handle, said lug means being shallower than said overhanging lip so as to engage positively beneath the lip if the handle is pushed upwardly while the mower is being pushed.

4. A reversible handle mounting for a machine having a wheeled frame, comprising: a pair of parallel centrally disposed longitudinally extending plates on opposite sides of the frame, each plate having a horizontal base and a pair of upwardly open notches each of which has a long, straight bottom margin and a straight lower side margin which intersect substantially at a right angle and are inclined at substantially 45° to the base of the plate, and an upper side margin which forms an acute angle with respect to the bottom margin to provide an overhanging lip; a handle having arms with flattened lower end portions alongside said plates which make swinging pin and slot connections with said plates below and midway between said notches so that the arms are swingable and longitudinally slidable; and a transversely extending latch and thrust plate on the flattened end portion of each of said arms, each said plate being only slightly narrower than the span across the opening of each notch and having a flat base so that said latch plate may be supported with its lower margin in the angle at the lower side margin of the notch, and said plate when the handle is swung upwardly with the plate in the notch being adapted to thrust into the angle at the upper side margin of the notch, said latch plates being disengageable from said notches only by endwise movement of said arms.

References Cited in the file of this patent

UNITED STATES PATENTS

| 604,704 | Sisley | May 24, 1898 |
| 843,770 | Ru Ton | Feb. 12, 1907 |
| 1,373,414 | Elphinstone | Apr. 5, 1921 |
| 2,347,991 | Cummings | May 2, 1944 |

FOREIGN PATENTS

| 169,326 | Great Britain | Sept. 20, 1921 |